United States Patent [19]

Mackenzie

[11] Patent Number: 4,699,456
[45] Date of Patent: Oct. 13, 1987

[54] HERMETIC FIBER SEAL

[75] Inventor: Donald R. Mackenzie, Bound Brook, N.J.

[73] Assignee: American Telephone and Telegraph Company, AT&T Bell Laboratories, Murray Hill, N.J.

[21] Appl. No.: 729,281

[22] Filed: May 1, 1985

[51] Int. Cl.[4] .................................................. G02B 6/36
[52] U.S. Cl. ................................................... 350/96.20
[58] Field of Search ............... 350/96.20, 96.21, 96.22; 250/227; 357/17, 19, 30

[56] References Cited

U.S. PATENT DOCUMENTS

| | | | |
|---|---|---|---|
| 4,119,363 | 10/1978 | Camlibel et al. | 350/96.20 |
| 4,166,668 | 9/1979 | MacLeod | 350/96.20 |
| 4,168,883 | 9/1979 | MacLeod | 350/96.20 |
| 4,222,629 | 9/1980 | Dassele et al. | 350/96.20 |
| 4,223,979 | 9/1980 | Piter et al. | 350/96.21 |
| 4,285,572 | 8/1981 | Beaudette et al. | 350/96.20 |
| 4,307,934 | 12/1981 | Palmer | 350/96.20 |
| 4,435,036 | 3/1984 | Sasakawa | 350/96.20 |
| 4,466,009 | 8/1984 | Konishi et al. | 357/30 |
| 4,487,474 | 12/1984 | Nishie et al. | 350/96.21 |
| 4,493,529 | 1/1985 | Doty | 350/96.20 |
| 4,533,209 | 8/1985 | Segerson, et al. | 350/96.20 |
| 4,548,465 | 10/1985 | White | 350/96.20 |
| 4,548,466 | 10/1985 | Evans et al. | 350/96.20 |

*Primary Examiner*—William L. Sikes
*Assistant Examiner*—Frank González
*Attorney, Agent, or Firm*—Lester H. Birnbaum

[57] ABSTRACT

Disclosed is an assembly for hermetically sealing lightwave component packages and aligning optical fibers. The fiber is fed through a tube and soldered at one end. The tube is inserted through a flange which is attached to the component package housing and which includes a threaded outside surface. A ring comprising a suitable material, such as gold, is provided between the end of the flange and a stop portion around the outside of the tube. A cap with a threaded portion is inserted over the stop and screwed onto the flange so that the pressure from the cap and restraint from the flange on the gold ring form an hermetic seal.

10 Claims, 6 Drawing Figures

HERMETIC FIBER SEAL

BACKGROUND OF THE INVENTION

This invention relates to lightwave optical component packages and, in particular, to an apparatus for aligning optical fibers and producing hermetic seals for such packages.

Lightwave transmitters typically take the form of a light source, such as a laser or light-emitting diode, mounted on a stud within a housing, with an optical fiber aligned with the source and extending through the housing wall. Similarly, a lightwave receiver will have a photodetector such as a pin diode in alignment with a fiber extending through a housing. A transceiver could include both light source and detector within a single housing, and a light switch could include fibers positioned through two or more housing walls and aligned with other fibers within the package.

In all such types of lightwave component packages, it is often desirable and even necessary to hermetically seal the component within the housing to prevent deterioration due to atmospheric conditions. This is especially true for terrestrial or submarine systems where the components must last for several years and cannot be repaired easily. The fact that one or more fibers must extend through the package housing and that these fibers must be precisely aligned with the component within the housing makes hermetic sealing quite problematic, especially in the case of single mode fibers, which have a very small core (typically, diameters of approximately 8 $\mu$m).

Proposals have been made regarding achieving hermetic seals in optical component packages. For example, U.S. Pat. No. 4,119,363, issued to Camlibel et al, suggests threading the fiber through a metal tube, filling the tube with solder, and then allowing it to cool so that the solder forms an hermetic seal. The tube-fiber assembly is then inserted through an aperture in the housing which is covered by a ferrule with a flange exterior to the housing. The fiber is aligned with the component and then the tube is soldered to the outside flange.

While such proposals are generally adequate for multimode fibers, the use of a soldering operation to lock the tube into place is difficult to implement since the use of flux could damage the component, and solder may not always wet the appropriate areas of the package. Further, the fiber has to be aligned with the component prior to soldering by a difficult and time-consuming operation involving a multiplicity of micropositioners. In addition, where single mode fibers are being aligned, the expansion and later contraction of the elements due to the heat of the soldering operation usually results in misalignment.

It is, therefore, a primary object of the invention to provide an optical component package with an hermetic seal. It is a further object of the invention to provide an assembly which produces such a seal and allows a quick but stable alignment of the fiber with the component within the housing. It is a still further object of the invention to provide an assembly which permits alignment of single mode fibers.

SUMMARY OF THE INVENTION

These and other objects are achieved in accordance with the invention which is a lightwave component package comprising a lightwave component mounted within a housing and an optical fiber aligned with the component and extending through an aperture in the housing wall. Means are provided for hermetically sealing and aligning the fiber which include a tube in which the optical fiber is positioned. The tube includes an opening at one end through which the fiber extends into the housing and also includes a stop portion on its outer surface at a position outside the housing. An hermetic seal is provided at said opening. A flange is mounted on the housing and surrounds the aperture in the housing wall so that the tube is positioned within an inner surface of the flange. Means are provided for applying pressure to the stop sufficient to form an hermetic seal between the flange and the tube.

BRIEF DESCRIPTION OF THE DRAWING

These and other features of the invention are delineated in detail in the following description. In the drawing.

It will be appreciated that, for purposes of illustration, these figures are not necessarily drawn to scale.

DETAILED DESCRIPTION OF THE INVENTION

Figure 1:
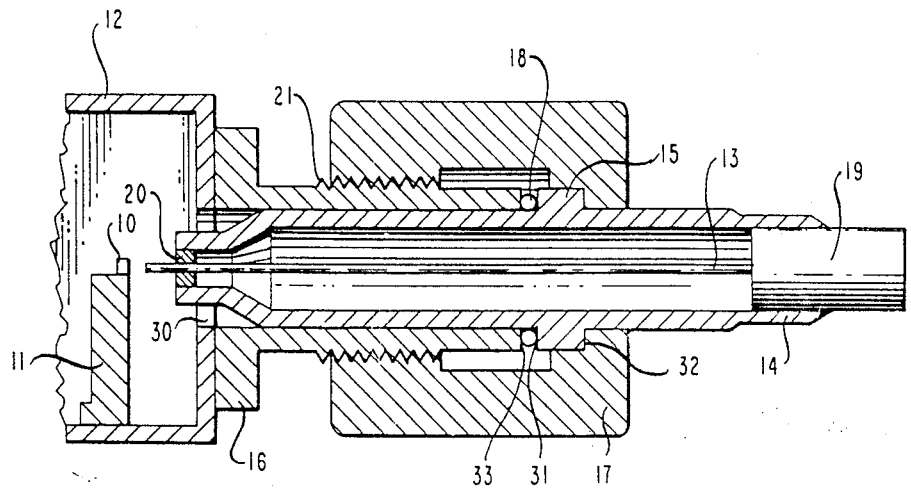
FIG. 1 is a cross-sectional view of a portion of a lightwave component package in accordance with one embodiment of the invention.

A portion of a lightwave component package in accordance with one embodiment of the invention is illustrated in cross section in FIG. 1. A typical semiconductor laser, 10, was mounted on a standard stud, 11, and enclosed within a housing, 12, made of an alloy comprising approximately 29 percent Ni, 17 percent Co, 0.3 percent Mn, and the balance Fe, which is sold by Carpenter Technology Corporation under the trademark "Kovar". The remainder of the component housing and additional components within the housing are omitted for the sake of clarity in the illustration. An optical fiber, 13, was inserted into an aperture, 30, in the housing and aligned with the light-emitting region of laser, 10, in order to transmit the light emitted therefrom. In this example, the fiber was single mode, with a core diameter of approximately 8 $\mu$m, and the laser was a single mode semiconductor laser with an active region of approximately 0.1 $\mu$m $\times$ 0.8 $\mu$m.

In order to provide proper alignment of the fiber and an hermetic seal for the package, the remaining components illustrated in the Figure were utilized. The fiber, 13, was inserted through a tube, 14, and threaded through a narrow opening at one end. The tube typically is made of a material such as Kovar which is chosen so that its thermal expansion is approximately equal to the sum of the expansion of the housing, 12, and the flange, 16, to be described. This ensures that changes in temperature will not cause any variations in the distance between the laser and fiber end once it has been aligned. The protective jacket, 19, which usually surrounds the optical fiber was stripped from most of the length of the fiber within the tube, 14. In order to hermetically seal the narrow opening of the tube through which the fiber is threaded, a typical solder 20 was applied to the opening along with a commercially available flux. In this example, the solder was 60 percent tin/40 percent lead and the flux was rosin. The solder was heated to a temperature of 190-250 degrees C. and then allowed to cool so that a seal was formed. The flux was then removed by a standard cleaning operation. It will be appreciated that insertion of the fiber through the tube and solder sealing of the opening takes place at some location remote from the laser package so there is no chance that the soldering or fluxing will harm the laser.

A flange, 16, typically made of an alloy comprising 36 percent Ni and the balance Fe, which is sold by Carpenter Technology Corporation under the trademark "Invar", was welded to the housing wall on the area surrounding the aperture, 30. The flange included a threaded portion, 21, on its outer surface and a smooth inner cylindrical surface with a diameter such that the tube, 14, can be slidably mounted within the flange while providing a snug fit. In this example, the diameter was approximately 0.152 inch.

The outer surface of the tube, 14, included a stop portion, 15. A washer or ring with a rectangular (including square) or circular cross section made of a malleable material such as gold was inserted over the tube near the surface, 31, of the stop portion closest to the narrow opening of the tube. The ring in this example had circular cross sections with diameters in the range 0.006-0.020 inch. The tube was then inserted through the flange, 16, until the ring, 18, was securely fitted between the end surface, 33, of the flange and the surface, 31, of the stop portion, 15.

An hermetic seal was formed between the flange and the tube by applying pressure to the stop and/or flange which was sufficient to deform the malleable metal ring. In this example, the pressure was supplied by a cap, 17, also made of Invar, with a head which was fitted over the stop portion, 15, and a threaded portion which engaged the threaded portion, 21, of flange, 16. Thus, when the cap was screwed onto the flange, pressure applied to surface, 32, of the stop and restraint supplied by the end, 33, of the flange sufficiently compressed the ring, 18, so that the seal was formed. The seal was maintained for temperatures at least in the range −40 to 250 degrees C. In addition, further twisting of the cap beyond the point at which the seal was formed allowed the fiber, 13, to be moved closer to the laser, 10, without breaking the seal. In this particular example, additional movement of approximately 9 mils was permitted after the seal was formed. Thus, once hermeticity was achieved, the distance of the fiber from the laser facet could be adjusted by tightening or loosening the cap while monitoring the light output from the fiber, and the need for micropositioners was eliminated for this axial alignment (z direction). The position of the fiber in this embodiment could be controlled to within 1 μm. (Alignment of the fiber in the vertical direction in the Figure and in the direction into and out of the plane of the Figure was provided by gripping a jewel (not shown) near the end of the fiber with a cross spring pivot micropositioner such as that shown in U.S. Pat. No. 3,814,365, issued to Mackenzie, and then epoxying the jewel to the stud.)

Figure 2:
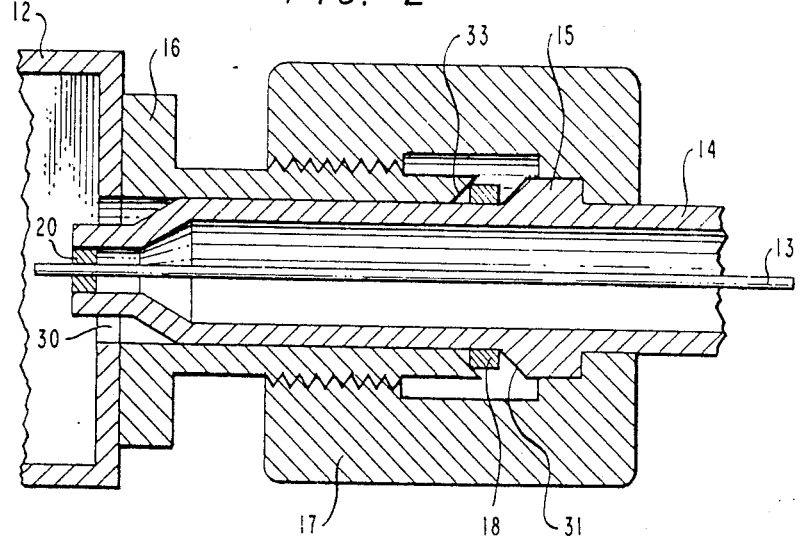
FIG. 2 is a cross-sectional view of a portion of a package in accordance with a further embodiment of the invention.

The leeway given for positioning the fiber in the z direction beyond the point of hermeticity can be increased by various design modifications, such as that shown in FIG. 2 (where the lightwave component has been omitted). It will be noted that the assembly of FIG. 2 is essentially identical to that of FIG. 1 except that the end surface 33 of the flange and surface 31 of the stop are both sloped, while the ring 18 is formed so as to have a square or rectangular cross section. (In this example, the ring was square with a dimension of 12 mils or 20 mils on each side.) This arrangement causes the pressure from the flange and stop to be exerted in the diagonal cross-sectional direction of the ring. Since the pressure needed to compress the ring is a function of the surface area being compressed, it will be appreciated that pressure applied to the corners of the square in a diagonal direction will produce a greater compression before the pressure limit is attained. Thus, the embodiment in FIG. 2 permits a larger movement of the tube and fiber assembly after hermeticity than that of FIG. 1. In this example, the fiber can be moved approximately 14 mils after the seal is formed. It will also be appreciated that this embodiment is advantageous even for circular cross-sectional rings since there will be a greater axial movement for the same amount of compression of the ring with sloped walls than with vertical walls.

Figure 3:
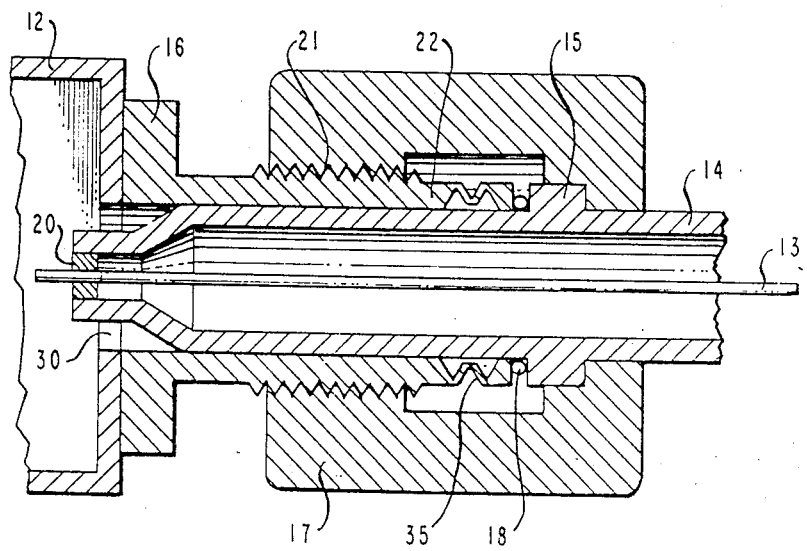
FIG. 3 is a cross-sectional view of a portion of a package in accordance with a still further embodiment.
Figure 4:
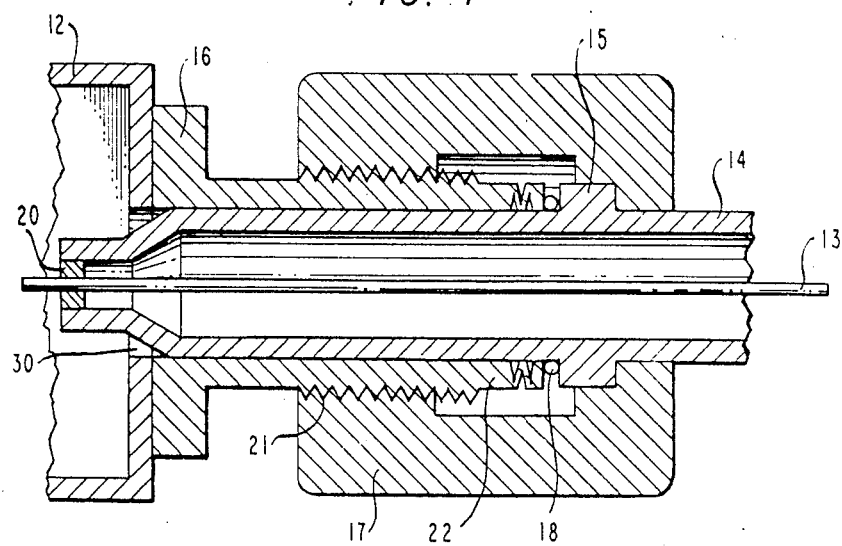
FIG. 4 is a cross-sectional view of the package of FIG. 3 at a different stage of adjustment.

FIGS. 3 and 4 illustrate another embodiment of the invention which provides for increased adjustment distance of the fiber. In this embodiment, all elements are essentially identical to FIG. 1 except that a portion 22 of the flange near the end surface is formed in a bellows configuration. In this example, the walls 35 of the bellows were approximately 0.010 inch thick. FIG. 3 illustrates the point at which the end of the flange and the stop compress the ring to form the seal. As shown in FIG. 4, further pressure applied by the cap 17 results in the contraction of the bellows portion 22 so that the tube and fiber assembly can be moved a greater distance to the left after the seal is formed. The total distance the assembly could be moved after hermeticity in this example was approximately 32 mils and the position of the fiber could be controlled to a distance of approximately 0.5 μm.

Figure 6:
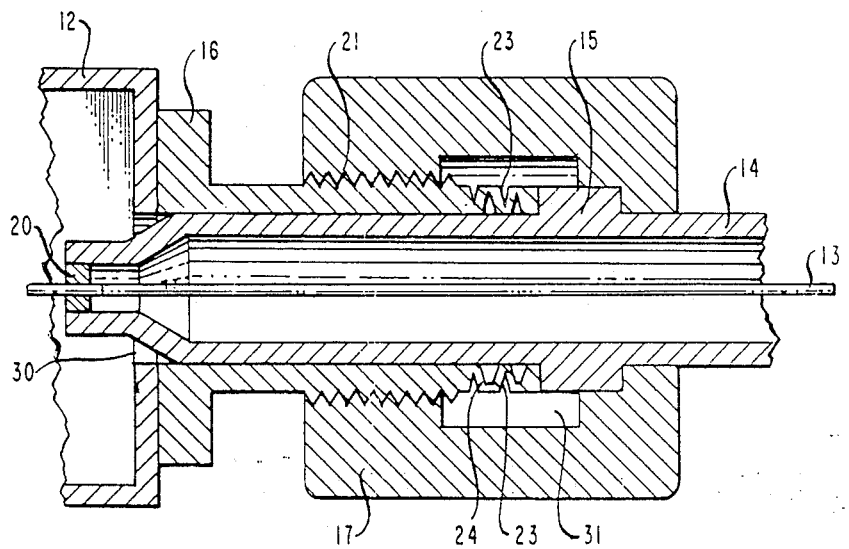
FIG. 6 is a cross-sectional view of the package of FIG. 5 at a different stage of adjustment.
Figure 5:
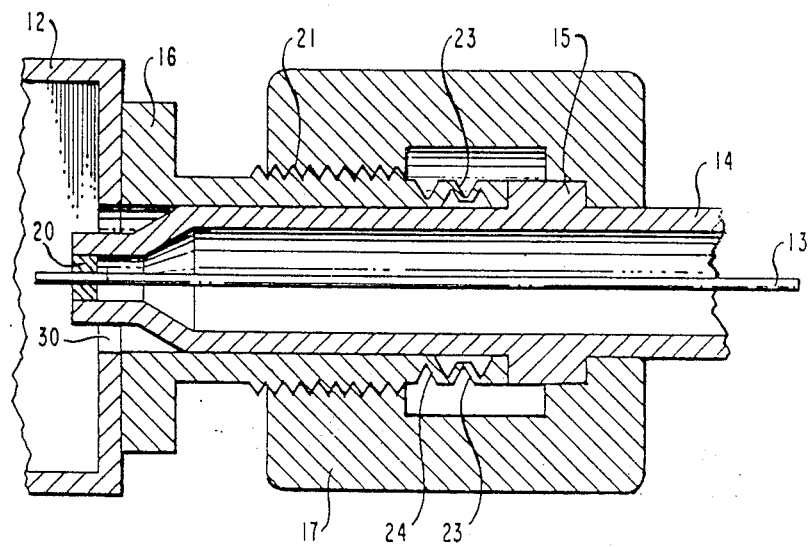
FIG. 5 is a cross-sectional view of a portion of a package in accordance with yet another embodiment of the invention.

It may also be possible to vary the flange in the FIG. 3 assembly to eliminate the ring 18. Such an embodiment is illustrated in FIGS. 5 and 6. As shown in FIG. 5, a similar bellows configuration is provided near the end surface of the flange. Here, however, two of the bellows walls, 23, are made much thinner than the bellows wall 24, the latter being the same thickness (0.010 inch) as in the previous embodiment. In this example, the thinner walls, 23, have a thickness of approximately 0.005-0.007 inch. It is recommended in this embodiment that the walls 23 be at least 25 percent thinner than the wall 24. The clearance between the outer diameters of the tube 14 and the apex of the bellows walls 23 in this example was less than 2 mils.

As illustrated in FIG. 6, pressure applied to the stop 15 by the cap 17 will cause the bellows walls 23 to collapse prior to the collapse of the wall 24. The walls, 23, act as a toggle in that a pressure applied in the horizontal direction will result in a larger pressure applied by the walls 23 in the vertical direction. the pressure of the bellows walls 23 against the wall of the tube 14 could, therefore, be sufficient to form an hermetic seal between the flange and the tube at the point illustrated in FIG. 6. Further movement of the tube and fiber to the left could then be effected by supplying further horizontal pressure which will collapse the thicker bellows wall 24. It will be appreciated that additional bellows walls could be provided in this and the previous embodiment.

Various additional modifications will become apparent to those skilled in the art. For example, while the ring used was gold, other malleable materials such as copper, aluminum, lead, and indium could be utilized to form the hermetic seals. In addition, the tube, flange and cap could be formed from other compatible materials. All such variations which basically rely on the teachings through which the invention has advanced the art are properly considered within the scope of the invention.

What is claimed is:

1. A lightwave component package comprising:
a lightwave component mounted within a housing;
an optical fiber aligned with the component and extending through an aperture in a wall of the housing; and
means for hermetically sealing and aligning the fiber comprising:
a tube in which the optical fiber is positioned, said tube including an opening at one end through which the fiber extends into the housing and a stop portion on the outer surface of the tube outside the housing, said tube further including an hermetic seal at said opening;
a flange mounted on said housing and surrounding said aperture so that said tube is positioned within an inner surface of said flange; and
means for applying pressure to the stop portion sufficient to form an hermetic seal between the flange and tube, the seal between the flange and tube being sufficiently compressible so that the position of the fiber can be adjusted by applying further pressure to the stop after the said hermetic seal is formed.

2. The package according to claim 1 wherein said flange includes an outer surface with a threaded portion and the means for applying pressure comprises a cap with a head portion in contact with one surface of the stop portion of the tube and a threaded portion which engages the threaded portion of the flange.

3. The package according to claim 1 further comprising a ring positioned around the outer surface of the tube between an end portion of the flange and a surface of the stop portion of the tube so that when said pressure is applied the ring forms the hermetic seal between the flange and the tube.

4. The package according to claim 3 wherein the ring comprises gold.

5. The package according to claim 1 wherein the flange further includes a bellows portion which may be contracted by applying pressure to the stop portion of the tube.

6. The package according to claim 5 wherein the bellows portion includes walls of sufficient length and thinness so that application of said pressure results in said walls making contact with the outer surface of the tube and forming the hermetic seal.

7. The package according to claim 3 wherein the end portion of the flange and the surface of the stop portion are sloped.

8. The package according to claim 1 wherein the opening through which the fiber extends is hermetically sealed by means of solder.

9. The package according to claim 1 wherein the optical fiber is a single mode fiber.

10. A lightwave component package comprising:
a lightwave component mounted within a housing;
a single mode optical fiber aligned with the component and extending through an aperture in a wall of the housing; and
means for hermetically sealing and aligning the fiber comprising:
a tube in which the optical fiber is positioned, said tube including an opening at one end through which the fiber extends into the housing and a stop portion on the outer surface of the tube outside the housing, said tube further including an hermetic solder seal at said opening;
a flange mounted on said housing and surrounding said aperture so that said tube is positioned within an inner surface of said flange, said flange further comprising a threaded portion on its outer surface;
a gold ring placed around the outer surface of the tube between an end portion of the flange and one surface of the stop portion of the tube; and
a cap with a head portion in contact with a surface of the stop portion opposite to said ring and including a threaded portion which engages the threaded portion of the flange so that twisting the cap compresses the gold ring to form an hermetic seal between the flange and tube and further twisting permits adjustment of the distance between the component and the end of the fiber.

* * * * *